(12) United States Patent
Chakraborty et al.

(10) Patent No.: US 8,819,171 B2
(45) Date of Patent: Aug. 26, 2014

(54) MONITORING AND BENCHMARKING CLIENT PERFORMANCE FROM THE SERVER-SIDE

(75) Inventors: Parag Chakraborty, Sunnyvale, CA (US); Charles Ogden, Los Gatos, CA (US); Bita Gorjiara, Sunnyvale, CA (US); Timothy Haydon Ward, Sunnyvale, CA (US); William Robert Williams, Renton, WA (US)

(73) Assignee: Microsoft Corporation, Redmond, WA (US)

(*) Notice: Subject to any disclaimer, the term of this patent is extended or adjusted under 35 U.S.C. 154(b) by 123 days.

(21) Appl. No.: 13/227,222

(22) Filed: Sep. 7, 2011

(65) Prior Publication Data

US 2013/0060837 A1 Mar. 7, 2013

(51) Int. Cl.
*G06F 15/16* (2006.01)

(52) U.S. Cl.
USPC ........... 709/217; 709/203; 709/227; 709/231; 709/247

(58) Field of Classification Search
USPC .................. 709/203, 217, 224, 231, 247, 248
See application file for complete search history.

(56) References Cited

U.S. PATENT DOCUMENTS

| 5,602,992 | A * | 2/1997 | Danneels ....................... 709/248 |
| 6,567,767 | B1 | 5/2003 | Mackey et al. |
| 7,725,576 | B2 | 5/2010 | Sitaraman et al. |
| 2008/0133739 | A1 * | 6/2008 | Zuzga et al. ................... 709/224 |
| 2010/0306413 | A1 * | 12/2010 | Kamay ........................ 709/247 |
| 2011/0125832 | A1 | 5/2011 | Dahl |

OTHER PUBLICATIONS

"ClientVantage Agentless Monitoring", Fact Sheet, Compuware Corporation, Copyright 2008, 4 pages.
"Managing IT Performance and Availability from an End-User Perspective", Solution Whitepaper, BMC Software, Jun. 15, 2006, 12 pages.
"Measure Network Throughput (Bandwidth) with Iperf", PowerCram, Jan. 1, 2010, 6 pages.
Hallock, "Optimizing the End-User Experience across Your Enterprise", A White Paper, ASG Software Solution, 2009, 1-8.
Nieh et al., "Measuring Thin-Client Performance Using Slow-Motion Benchmarking", ACM Transactions on Computer Systems, Feb. 2003, 21(1), 87-115.

* cited by examiner

*Primary Examiner* — Yves Dalencourt
(74) *Attorney, Agent, or Firm* — Jim Sfekas; Kate Drakos; Micky Minhas

(57) ABSTRACT

A system, method, and computer product for monitoring and benchmarking client devices from a server. A server, data center, and/or cloud computing environment may monitor certain aspects of a remote desktop session. The rendering, capture, and compression of a desktop may be monitored. The time between the sending of frames to a thin client can be monitored, the network bandwidth available can be monitored and the time between sending a frame and receiving a response from the thin client can be monitored. Based on these values, a benchmark for the remote desktop experience can be determined.

20 Claims, 9 Drawing Sheets

MONITORING AND BENCHMARKING CLIENT PERFORMANCE FROM THE SERVER-SIDE

BACKGROUND

The architecture of computing devices has changed drastically over time. In part, this is due to the changing availability of resources, including hardware, software, and networking resources. In each generation of computing, as the availability of resources changes, new architectures are considered based on perceived and actual benefits of one system over another. As an example, computing devices have recently moved from desktop, to laptop, to mobile devices, and even more recently, centralized services rendering desktops and displaying them on client devices have become a viable option.

Companies have proposed cloud computing as a way to decrease the hardware requirements on end user devices. With cloud computing, some of the computing elements and computer functionality may be moved to a server, data center, and/or collection of data centers. For example, hardware, memory, processing, data storage and the like can take place in a data center and the data center can transmit information to a thin client and receive data from the thin client.

SUMMARY

Cloud computing, hosted desktops, virtual desktop infrastructure solutions, terminal services, hyper-v servers, window virtualization servers, and the like include servers sending display content to a client, receiving data from the client as responses to sending the display content, and receiving requests from the client. Processing instructions, performing calculation and rendering can all be done in the cloud or at the server side and as such, the client can be a 'dumb' machine, capable of receiving display data, receiving input from a user, sending instructions to a server, and little more.

Clients, which may be known as thin clients, tend to vary widely in their capabilities. For example, some thin client devices may be smartphones or other devices with limited functionality with regard to processing, memory, video memory, bandwidth, networking, and display. Other thin client devices may be advanced PCs, which have significant hardware and software capabilities. The hardware available on a client device may affect the quality of the interaction between a server and a thin client device. In turn, reduced quality in interaction can lead to a poor user experience.

In addition to the hardware of a given thin client, the network connection between a thin client and a server may affect the experience of the thin client user. Further, the server may be overburdened such that it is unable to meet the demand of one or more thin clients connected to it.

Accordingly, it is important to determine the quality of the interaction between a server and any given thin client. Previously proposed ways of determining the quality of interaction have included software running on the thin client device or monitoring an aspect of the thin client device, such as the frame rate at the thin client. On the one hand, having software on a thin client creates an additional requirement for the thin client while monitoring single aspects such as frame rate may provide an incomplete or poor picture of the quality of the connection with a thin client. As such, included herein are embodiments of monitoring and benchmarking client devices from a server.

In an embodiment, a uniform benchmarking solution is provided by monitoring data that is being pushed from the server to a client and monitoring the responses received at a server from a client. In such an embodiment, the monitoring is done on the server side.

In an embodiment, processing for a client takes place in a data center. A desktop for the client is also rendered, captured and compressed into frames. A first frame of the desktop is sent to the client. Upon receiving the frame, the client sends a response. A second frame is sent to the client. Upon receiving the second frame the client sends a second response. The time between the sending of consecutive frames is determined and the time between sending, for example, the first frame and receiving the first response is determined. This information can be compared to a predetermined set of times for consecutive sending and response times. Based on this comparison, a variety of actions may be taken to improve the end user experience.

In another embodiment, the rendering, capture, and compression rates may be measured. As one example, the rendering rate may be the speed at which a frame of the desktop is rendered, the capture rate may be the rate at which a desktop frame is captured, and the compression rate may be the speed at which a frame is compressed. Each of these rates individually, or in combination may be compared against one or more predetermined values. Based on this comparison, the data center may change one or more aspects of its operation.

In another embodiment, the network bandwidth consumed by the sending of a first frame, or by the sending of multiple frames may be monitored. This network bandwidth may be compared to a predetermined value. Based on the network bandwidth comparison, one or more changes may be made to adapt the frame rate, the rendering, compression, processing, capture rate, and/or sending rate at the data center.

In an embodiment, predetermined values for the network bandwidth, rendering, compression, processing, capture rate, frame rate, time between frame sends and the time for receiving a response after sending a frame may be stored on one or more computing devices. These values may be compared to corresponding values of a client-data center interaction. The comparisons may provide information that can be used to determine if certain components in a client-data center interaction are acting as a bottle neck and what steps need to be taken to correct the bottle neck.

BRIEF DESCRIPTION OF THE DRAWINGS

The systems, methods, and computer readable media for deploying a software application to multiple users in a virtualized computing environment in accordance with this specification are further described with reference to the accompanying drawings in which.

DETAILED DESCRIPTION OF ILLUSTRATIVE EMBODIMENTS

Figure 1:
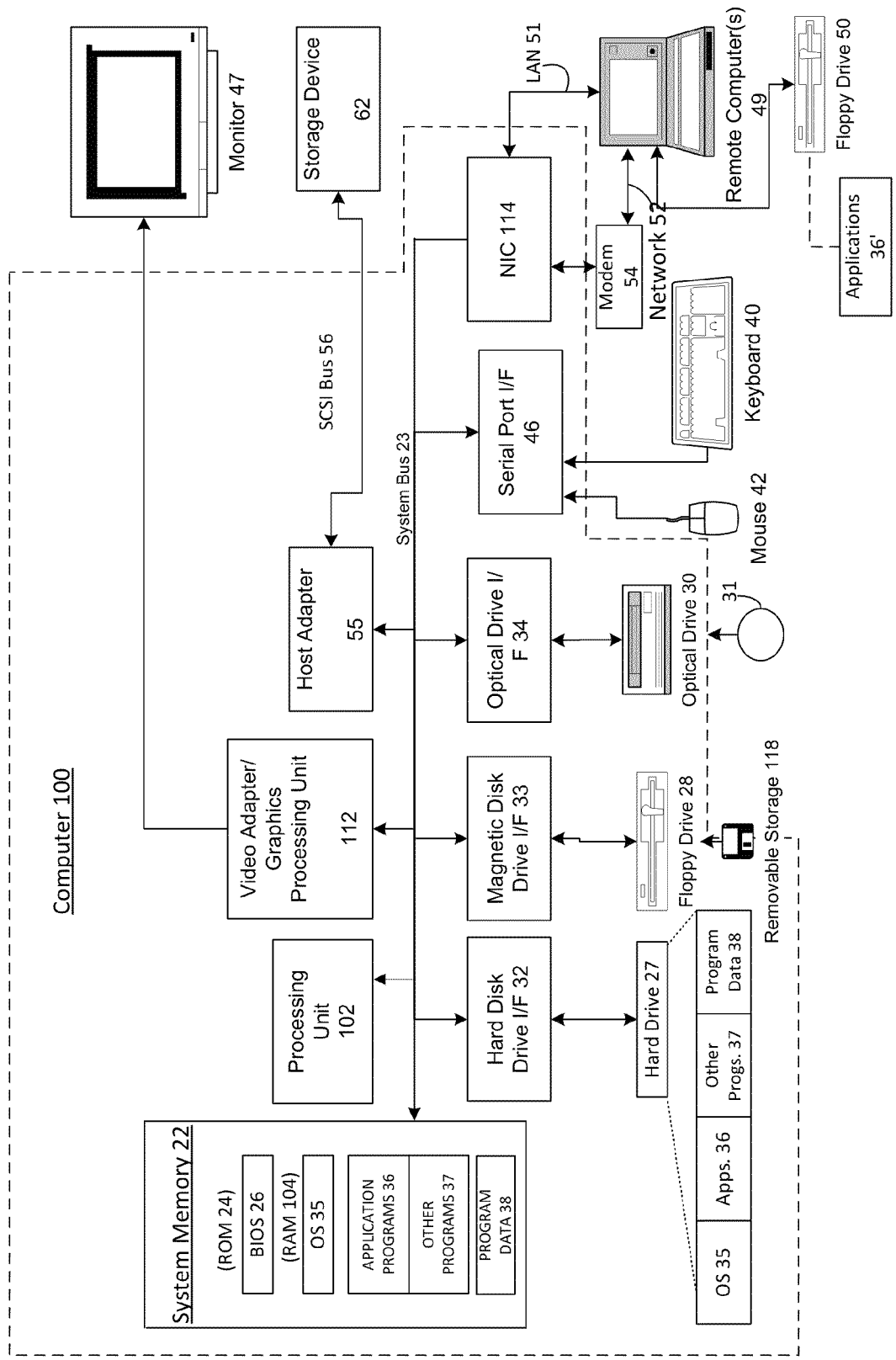
FIG. 1 depicts an example computing environment wherein aspects of the present disclosure can be implemented.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

In an embodiment, a client may be connected via a network to a server. The server may be part of a data center. A data center may be connected to one or more other data centers. Each computing component of a data center is part of a cloud computing environment, a computing cloud, or simply the cloud. One or more computing components in the data center may perform computing and processing tasks based on requests, instructions and the like received from the client. Among other things, the cloud computing environment may have computing resources that perform computing functions, render a client desktop for the client, capture the client desktop, compress the client desktop and send the client desktop as a series of one or more frames to the client. The cloud computing environment may receive responses to the sent frames as well as instructions, data, and the like from the client.

The cloud computing environment may monitor one or more aspects of the interaction between the cloud computing environment and the client. For example, the available bandwidth may be monitored. As another example, the time between the sending of consecutively set frames may be monitored. Further, the time it takes for one or more of rendering, capturing, compressing and sending may be monitored. In addition, the time between the sending of a frame to a computing device and receiving a response from the computing device may be monitored.

In an embodiment, each of the monitored aspects of the client-cloud computing environment interaction is monitored at the cloud computing environment. As such, benchmarking may be performed utilizing information available to the cloud computing environment. Therefore, a given client would not need to have benchmarking software installed. Thus, bandwidth and processing at the client can be saved.

In addition to benchmarking, in an embodiment, the monitored aspects of the client-cloud computing environment interaction may be used to optimize the interaction and determine the quality of the user experience at the client. As one example, the monitored data provides enough specific information to determine if a bottleneck is taking place at a computing component in the cloud computing environment with the network connection, or at the client device. Further, upon determining the source of a bottleneck, one or more actions may be taken to fix the problem.

Embodiments may execute on one or more computers. FIG. 1 and the following discussion are intended to provide a brief general description of a suitable computing environment in which the disclosure may be implemented. One skilled in the art can appreciate that computer system 200 can have some or all of the components described with respect to computer 100 of FIG. 1.

FIG. 1 depicts an example of a computing system which is configured to work with aspects of the disclosure. The computing system can include a computer 100 or the like, including a logical processing unit 102, a system memory 22, and a system bus 23 that couples various system components including the system memory to the logical processing unit 102. The system bus 23 may be any of several types of bus structures including a memory bus or memory controller, a peripheral bus, and a local bus using any of a variety of bus architectures. The system memory includes read only memory (ROM) 24 and random access memory (RAM) 104. A basic input/output system 26 (BIOS), containing the basic routines that help to transfer information between elements within the computer 100, such as during start up, is stored in ROM 24. The computer 100 may further include a hard disk drive 27 for reading from and writing to a hard disk, not shown, a magnetic disk drive 28 for reading from or writing to a removable magnetic disk 118, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 104, removable magnetic disk 118, optical disk 31, and/or a cache of logical processing unit 102. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the computer 100. Although the environment described herein employs a hard disk, a removable magnetic disk 118 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 118, optical disk 31, ROM 24 or RAM 104, including an operating system 35, one or more application programs 36, other program modules 37 and program data 38. A user may enter commands and information into the computer 100 through input devices such as a keyboard 40 and pointing device 42. Other input devices (not shown) may include a microphone, joystick, game pad, satellite disk, scanner or the like. These and other input devices are often connected to the logical processing unit 102 through a serial port interface 46 that is coupled to the system bus, but may be connected by other interfaces, such as a parallel port, game port or universal serial bus (USB). A display 47 or other type of display device can also be connected to the system bus 23 via an interface, such as a GPU/video adapter 112. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 100 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 100, although only a memory storage device 50 has been illustrated in FIG. 1. The logical connections depicted in FIG. 1 can include a local area network (LAN) 51 and a network 52. Network 52 can be a wide area network (WAN) a local network, a wireless network, the internet or any other type of network known in the art. Such networking environments are commonplace in offices, enterprise wide computer networks, intranets and the Internet.

When used in a LAN networking environment, the computer 100 can be connected to the LAN 51 through a network interface controller (NIC) or adapter 114. When used in a WAN networking environment, the computer 100 can typically include a modem 54 or other means for establishing communications over the network 52, such as the Internet. The modem 54, which may be internal or external, can be connected to the system bus 23 via the serial port interface 46. In a networked environment, program modules depicted relative to the computer 100, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Turning to FIGS. 2(A-B), illustrated are exemplary virtualization platforms that can be used to generate the virtual machines used for virtual desktop sessions. In this embodiment, hypervisor microkernel 202 can be configured to control and arbitrate access to the hardware of computer system 200. Hypervisor microkernel 202 can generate execution environments called partitions such as child partition 1 through child partition N (where N is an integer greater than 1). Here, a child partition is the basic unit of isolation supported by hypervisor microkernel 202. Hypervisor microkernel 202 can isolate processes in one partition from accessing another partition's resources. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped device, hypervisor microkernel 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provides a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 2A:
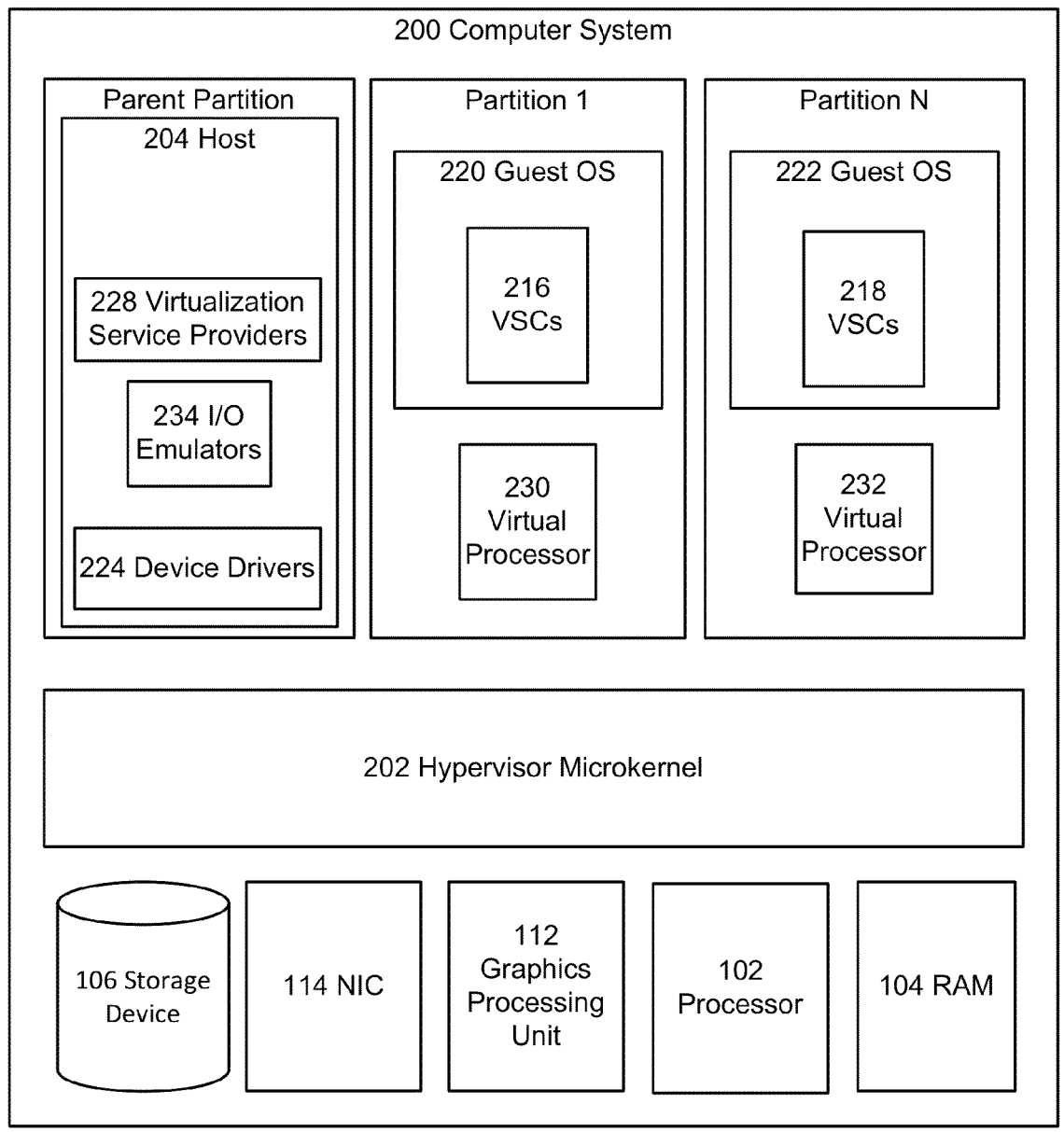
FIGS. 2(A-B) depict an example computing environment wherein aspects of the present disclosure can be implemented.
Figure 2B:
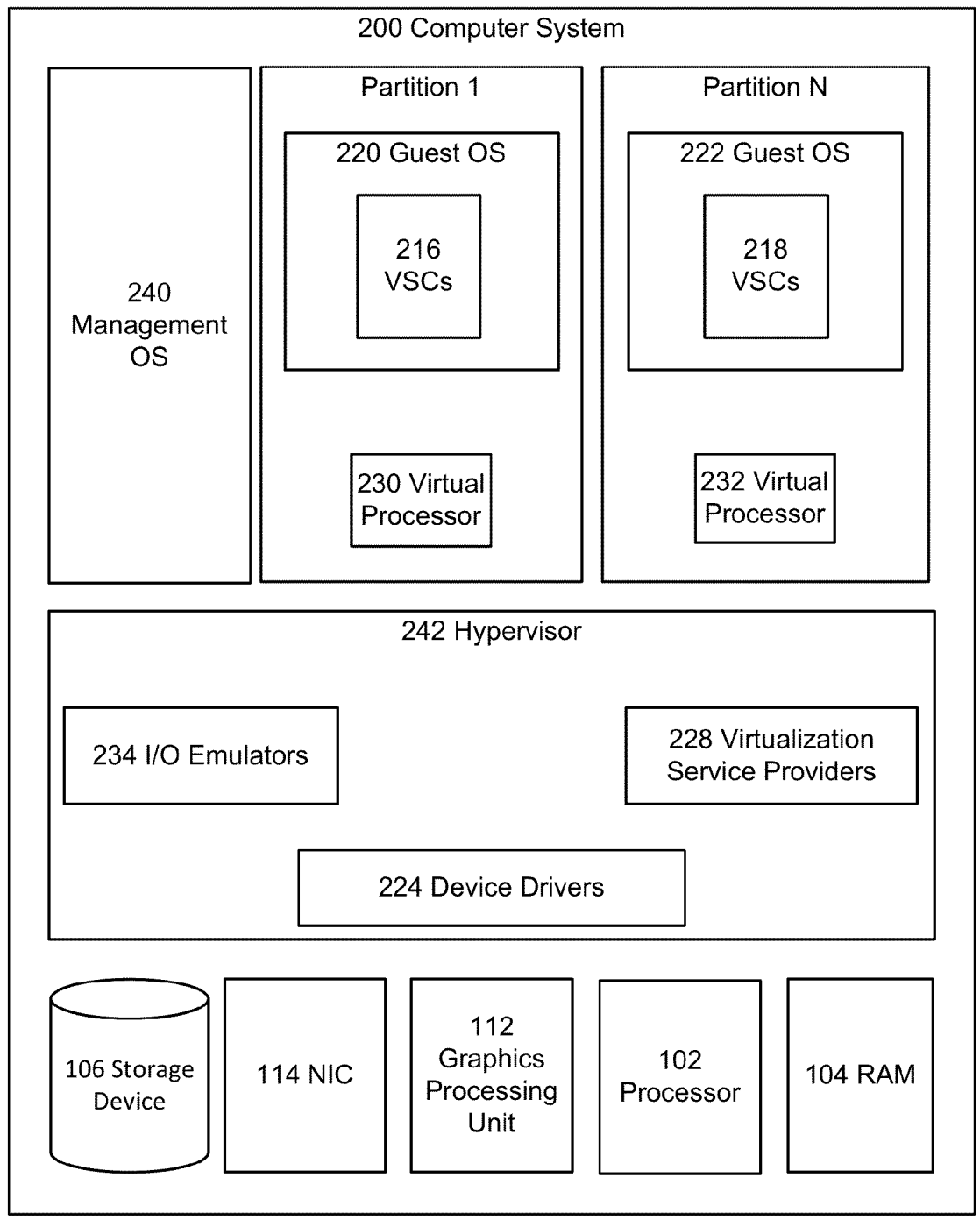

Referring now to FIG. 2(B), it depicts similar components to those of FIG. 2(A); however, in this example embodiment hypervisor 242 can include a microkernel component and components similar to those in host 204 of FIG. 2(A) such as the virtualization service providers 228 and device drivers 224, while management operating system 240 may contain, for example, configuration utilities used to configure hypervisor 242. In this architecture, hypervisor 302 can perform the same or similar functions as hypervisor microkernel 202 of FIG. 2(A) and host 204. Hypervisor 242 of FIG. 2(B) can be a standalone software product, a part of an operating system, embedded within firmware of a motherboard, and/or a portion of hypervisor 242 can be effectuated by specialized integrated circuits.

Figure 3:
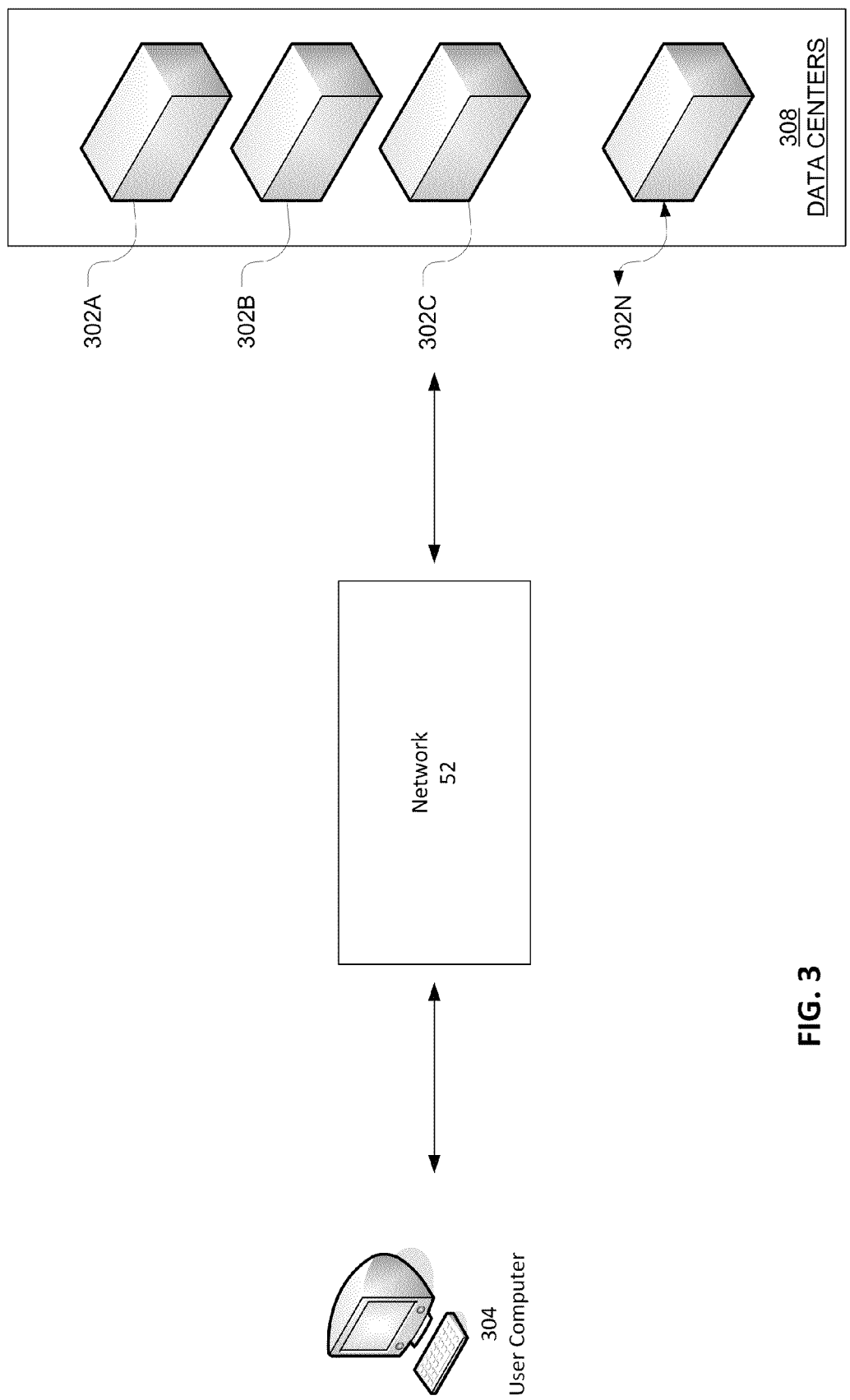
FIG. 3 depicts an example computing environment including data centers.

FIG. 3 and the following description are intended to provide a brief, general description of an example computing environment in which the embodiments described herein may be implemented. In particular, FIG. 3 is a system and network diagram that shows an illustrative operating environment that includes data centers 308 for providing computing resources. Data centers 308 can provide computing resources for executing applications and providing data services on a continuous or an as-needed basis. The computing resources provided by the data centers 308 may include various types of resources, such as data processing resources, data storage resources, data communication resources, and the like. Each type of computing resource may be general-purpose or may be available in a number of specific configurations. For example, data processing resources may be available as virtual machine instances. The virtual machine instances may be configured to execute applications, including Web servers, application servers, media servers, database servers, and the like. Data storage resources may include file storage devices, block storage devices, and the like.

Each type or configuration of computing resource may be available in different sizes. For example, a large resource configuration may be comprised of many processors, large amounts of memory, and/or large storage capacity, and a small resource configuration may be comprised of fewer processors, smaller amounts of memory, and/or smaller storage capacity. Users may choose to allocate a number of small processing resources as Web servers and/or one large processing resource as a database server, for example.

The computing resources provided by the data centers 308 may be enabled by one or more individual data centers 302A-302N (which may be referred herein singularly as "a data center 302" or in the plural as "the data centers 302"). Computing resources in one or more data centers may be known as a cloud computing environment. The data centers 302 are facilities utilized to house and operate computer systems and associated components. The data centers 302 typically include redundant and backup power, communications, cooling, and security systems. The data centers 302 might also be located in geographically disparate locations. One illustrative configuration for a data center 302 that implements the concepts and technologies disclosed herein for scalably deploying a virtualized computing infrastructure will be described below with regard to FIG. 3.

The users and other consumers of the data centers 308 may access the computing resources provided by the cloud computing environment 302 over a network 52, which may be similar to the network described above with respect to FIG. 1. Although a WAN is illustrated in FIG. 1, it should be appreciated that a local-area network ("LAN"), the Internet, a wireless network or any other networking topology known in the art that connects the data centers 302 to remote consumers may be utilized. It should also be appreciated that combinations of such networks might also be utilized.

The user computing system 304 may be a computer utilized by a user or other consumer of the data centers 308. For instance, the user system 304 may be a server computer, a desktop or laptop personal computer, a tablet computer, a wireless telephone, a personal digital assistant ("PDA"), an e-reader, a game console, a set-top box, or any other computing device capable of accessing the data centers 308.

The user computing system 304 may be utilized to configure aspects of the computing resources provided by the data centers 308. In this regard, the data centers 308 might provide a Web interface through which aspects of its operation may be configured through the use of a Web browser application program executing on the user computing system 304. Alternatively, a stand-alone application program executing on the user computing system 304 might access an application programming interface ("API") exposed by the data centers 308 for performing the configuration operations. Other mechanisms for configuring the operation of the data centers 308, including deploying updates to an application, might also be utilized.

FIG. 3 depicts a computing system diagram that illustrates one configuration for a data center 302 that implements data centers 308, including the concepts and technologies disclosed herein for scalably deploying a virtualized computing infrastructure. The example data center 302 A-N shown in FIG. 3 includes several server computers 402A-402N (which may be referred herein singularly as "a server computer 402" or in the plural as "the server computers 402") for providing computing resources for executing an application. The server computers 402 may be standard server computers configured appropriately for providing the computing resources described above. For instance, in one implementation the server computers 402 are configured to provide the processes 406A-406N. It is also important to note that while the data center depicts several servers and computers, in an embodiment, the functionality of the several devices of FIG. 3 are implemented in a single computing device. Any number of computing devices may be used.

In another embodiment, server computers 402A-402N may be computing devices configured for specific functions. For example, a server may have a single type of processing unit and a small amount of cache memory only. As another example, memory storage server computers 402 may be memory severs comprising a large amount of data storage capability and very little processing capability. As a further example, one or more GPUs may be housed as GPU processing server device. Thus servers 402 may be provided with distinctive and/or special purpose capabilities. The servers, memory storage server computers and GPU processing servers may be connected with each other via wired or wireless means across machine boundaries via a network.

As an example of the structure above, an application running in a data center may be run on a virtual machine that utilizes resources from one or more of the servers 402A, utilizing memory from one or more memory storage server 402 B, one or more GPU processing servers 402C, and so on. The virtual machine may migrate between physical devices, add devices and/or subtract devices. Accordingly, the data center may include the functionality of computing device 100 and 200 noted above with respect to FIGS. 1-2(A-B) across machine boundaries. In an embodiment, sets of one or more computing devices may be managed by managing computing devices, such as a server manager, a memory manager, a GPU manager and the like. The managing devices may be used to determine when computing resources of a particular type need to be added or subtracted and may route information to devices that are performing processes.

In one embodiment, the processes 406A-406N (which may be referred herein singularly as "a process 406" or in the plural as "the processes 406") may be virtual machine instances. A virtual machine instance may be a virtual machine such as described above with respect to FIGS. 2A and 2B. In the example of virtual machine instances, each of the servers 402A may be configured to execute an instance manager capable of executing the instances. The instance manager might be a hypervisor or another type of program configured to enable the execution of multiple processes 406 on a single server 402 A, utilizing resources from one or more memory storage servers 402B and one or more GPU servers 402C for example. As discussed above, each of the processes 406 may be configured to execute all or a portion of an application.

It should be appreciated that although some of the embodiments disclosed herein are discussed in the context of virtual machine instances, other types of instances can be utilized with the concepts and technologies disclosed herein. For example, the technologies disclosed herein might be utilized with instances of storage resources, processing resources, data communications resources, and with other types of resources. The embodiments disclosed herein might also be utilized with computing systems that do not utilize virtual machine instances i.e. that use a combination of physical machines and virtual machines.

Figure 4:
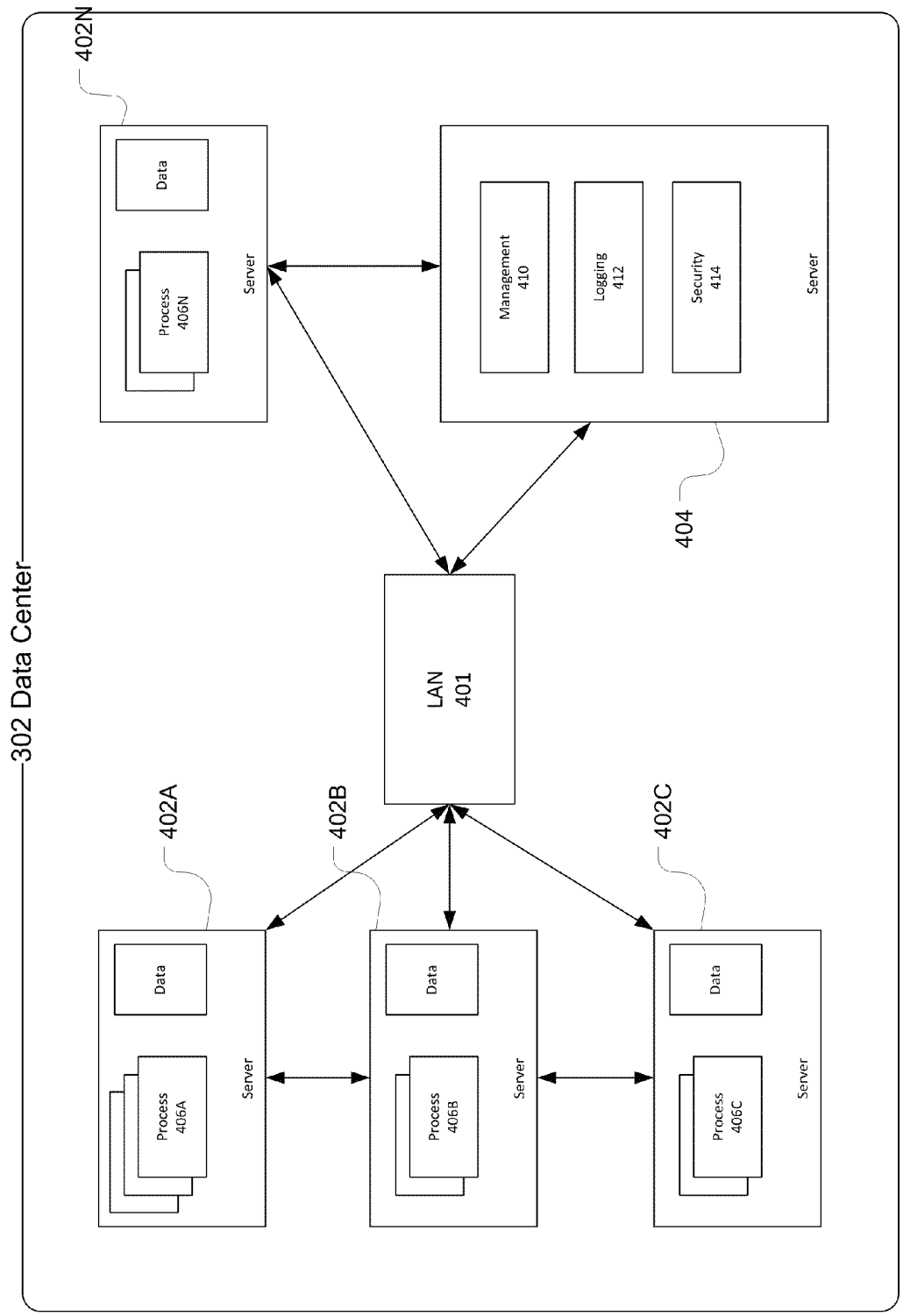
FIG. 4 depicts an operational environment of a data center.

The data center 302 A-N shown in FIG. 4 also may also include one or more managing computing devices 404 reserved for executing software components for managing the operation of the data center 302 A-N, the server computers 402A, memory storage server 402C, GPU servers 402C, and the resources associated with each 406. In particular, the managing computers 404 might execute a management component 410. As discussed above, a user of the data centers 308 might utilize the user computing system 304 to access the management component 410 to configure various aspects of the operation of data centers 308 and the instances 406 purchased by the user. For example, the user may purchase instances and make changes to the configuration of the instances. The user might also specify settings regarding how the purchased instances are to be scaled in response to demand.

In the example data center 302 shown in FIG. 4, an appropriate LAN 401 is utilized to interconnect the server computers 402A-402N and the server computer 404. The LAN 401 is also connected to the network 52 illustrated in FIG. 3. It should be appreciated that the network topology illustrated in FIGS. 4 and 5 has been greatly simplified and that many more networks and networking devices may be utilized to interconnect the various computing systems disclosed herein. Appropriate load balancing devices or software modules might also be utilized for balancing a load between each of the data centers 302A-302N, between each of the server computers 402A-402N in each data center 302, and between instances 406 purchased by each user of the data centers 308. These network topologies and devices should be apparent to those skilled in the art.

It should be appreciated that the data center 302 A-N described in FIG. 4 is merely illustrative and that other implementations might be utilized. Additionally, it should be appreciated that the functionality disclosed herein might be implemented in software, hardware, or a combination of software and hardware. Other implementations should be apparent to those skilled in the art.

Cloud computing generally refers to a computing environment for enabling on-demand network access to a shared pool of computing resources (e.g., applications, servers, and storage) such as those described above. Such a computing environment may be rapidly provisioned and released with minimal management effort or service provider interaction. Cloud computing services typically do not require end-user knowledge of the physical location and configuration of the system that delivers the services. The services may be consumption-based and delivered via the Internet. Many cloud computing services involve virtualized resources such as those described above and may take the form of web-based tools or applications that users can access and use through a web browser as if they were programs installed locally on their own computers.

Cloud computing services are typically built on some type of platform. For some applications, such as those running inside an organization's data center, this platform may include an operating system and a data storage service configured to store data. Applications running in the cloud may utilize a similar foundation.

In one embodiment and as further described in FIG. 5, a cloud service can implement an architecture comprising a stack of four layers as follows:

cloud computing platform configured to provide the resources to support the cloud services desktop provisioning and management layer for creating and managing the cloud computing assets that enable application providers to provide applications, and enterprise desktop providers to create and manage desktops, users to connect to their desktops, etc. This layer can translate the logical view of applications and desktops to the physical assets of the cloud computing platform.

an application provider/enterprise desktop provider/desktop reseller/user experiences layer that provides distinct end-to-end experiences for each of the four types of entities described above.

vertical layer that provides a set of customized experiences for particular groups of users and provided by desktop resellers.

Figure 5:
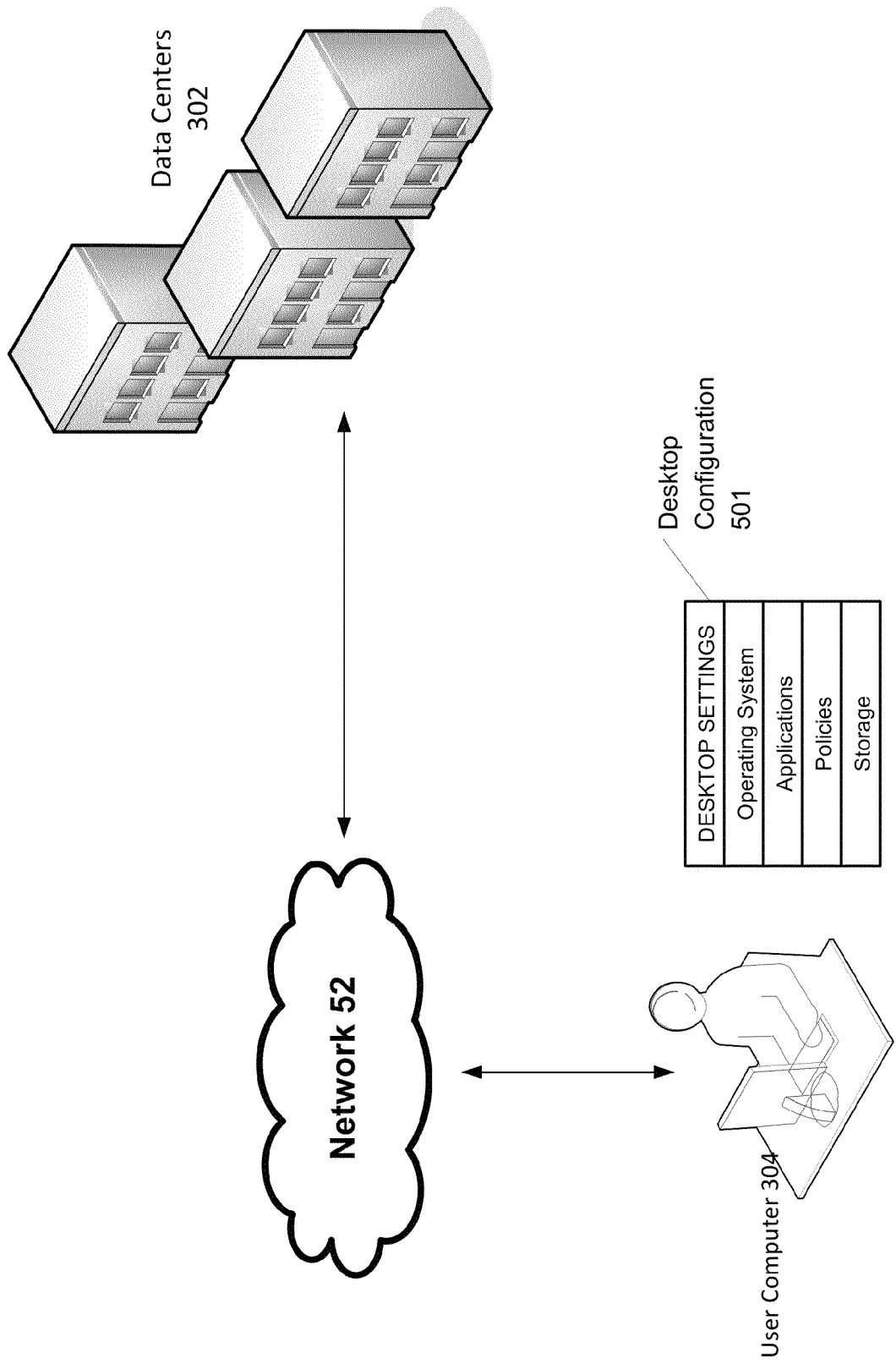
FIG. 5 depicts an operational environment for practicing aspects of the present disclosure.

FIG. 5 depicts another figure of a remote desktop/thin client application. A user computer 304, which can be computer 100, or 200 of FIGS. 1-2(A-B) acting in a remote desktop setting as a thin client is shown in contact via a network 52 with one or more data centers 302 A-N. The thin client may have certain configurations associated with the desktop, including desktop configuration 501. That configuration may include an operating systems, applications, policies and storage. The data center may be configured with drivers and settings necessary for compatibility with the desktop configuration 501. In an embodiment, desktop configurations 501 may dictate in part what set of servers, memories, GPUs and other computing resources at data centers 302 A-N a remote desktop is rendered on.

With regard to a remote desktop, a server may be associated with one or more applications requested by the client. The server access resources across one or more data centers and may render the entire desktop of the client with a virtual graphics driver. The desktop may then be flattened into a bitmap. The rendered bit can be compressed in one or more ways. As a first example, a bitmap may be compressed by comparing it to a previous rendering of a bitmap and determining the differences between the two bitmaps and only sending the differences. As another example, lossy or lossless compression formats may be used, such as run length encoding (RLE), BBC, WAH, COMPAX, PLWAH, CONCISE, LZW, LZMA, PPMII, BWT, AC, LZ, LZSS, Huff, f, ROLZ, CM, Ari, MTF, PPM, LZ77, JPEG, RDP, DMC, DM, SR, and bit reduction quantization. After compression, the server will send the compressed data in the form of payloads to the client. In response to receiving the payloads, the client may send a response to the server. The response may indicate that the client is ready to receive additional payloads or process more data.

Figure 6:
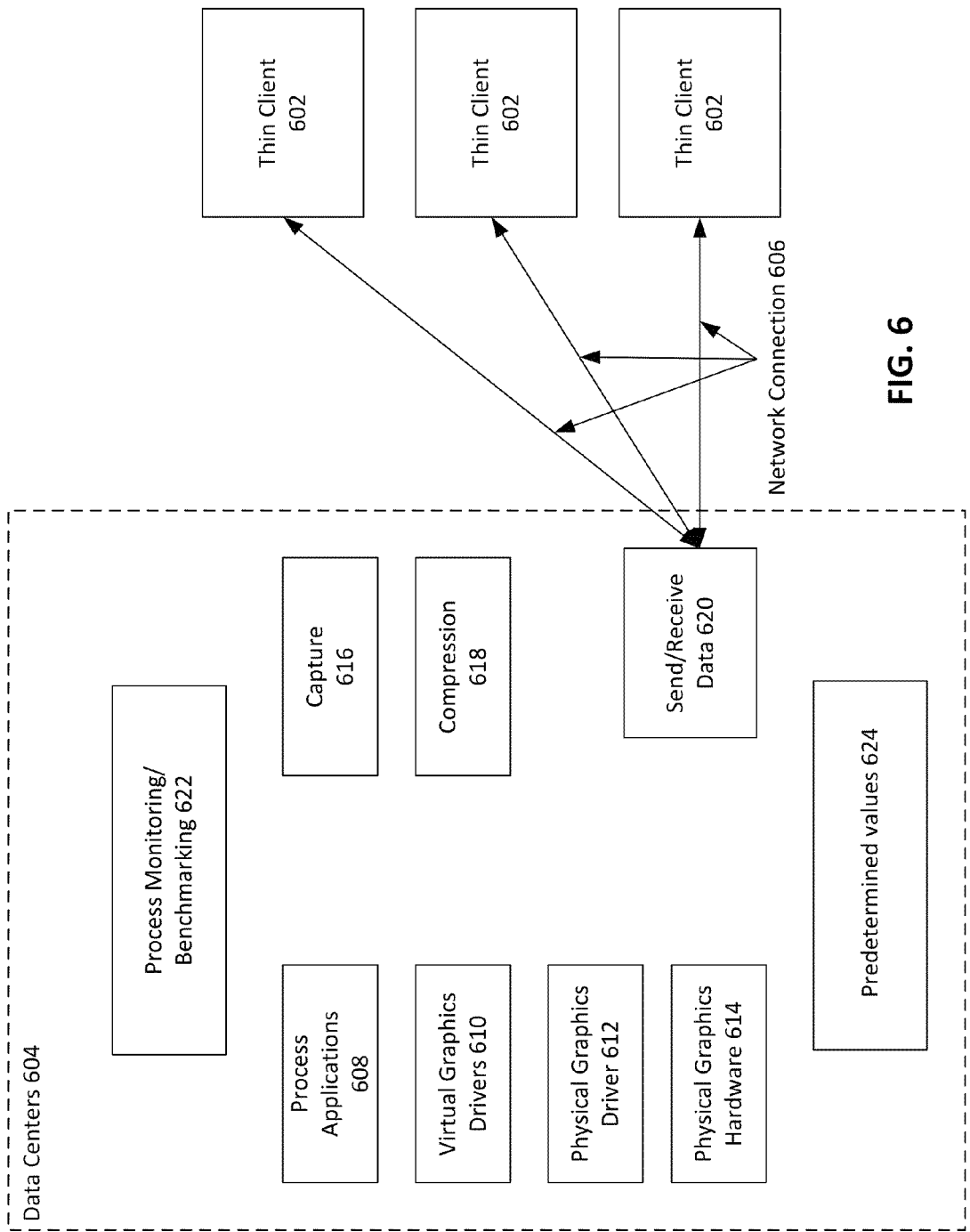
FIG. 6 depicts an example embodiment of a cloud computing environment comprising one or more computing devices for monitoring and benchmarking client performance.

FIG. 6 depicts an example embodiment of a data center or cloud computing environment connected to a plurality of thin clients. It should be understood that the number of thin clients, connections, computing devices, servers, and processes are merely representative and are in no way limiting. The following may take place on a single computing device or server, or it may take place in a cloud computing environment comprising a plurality of computing components and data centers, or it may take place in any computing environment in between. As described herein, processes, applications, services and connections in computing environments may migrate from a first set of one or more computing devices to a second set of one or more computing devices.

In an embodiment, aspects of computing environment 604 may be connected via network connections 606, which may be similar to network 52 described above with respect to FIGS. 1, 3, and 5, to one or more thin clients 602. Each thin client may be similar to computer 100 and 200 of FIG. 1 and/or FIGS. 2(A-B). Each thin client may comprise hardware and/or software to facilitate various computing functions. Each thin client, however, comprises the possibility of receiving data from the computing environment 604, the data associated with a remote desktop session hosted at the computing environment 604.

In an embodiment, the computing environment 604 may be similar and may contain any components as described with respect to data center 308 of FIG. 3. For example, the components 402A-402N of FIG. 4 may provide the computing capability to perform monitoring and benchmarking of client performance from one or more data centers 302A-302N of FIG. 3.

Computing environment 604 may comprise hardware and software to process one or more applications 608 on behalf of one or more thin client 602. In one embodiment, the applications include a desktop application configured to correspond with the applications, operating systems, hardware, devices, and drivers of the thin client. Any other software application including but not limited to programming, gaming, word processing, media, office and any other software may be incorporated as a processed applications 608. In an embodiment the processed applications 608 may be running on one or more virtual machines such as described above with respect to FIGS. 2(A-B).

The computing environment 604 may be associated with one or more virtual graphics drivers 610, which may be device drivers 224 of FIG. 3. The virtual graphics drivers may be associated with the processed applications and may be configured to work with the physical graphics drivers 612 and physical graphics hardware 614 of computing environment 604. In another embodiment, the virtual graphics drivers may be configured to work with the thin clients 602 and with hardware associated with the thin clients 602. As one example, the virtual graphics drivers may be run one or more virtual machines as described above with respect to FIGS. 2(A-B). Further, the virtual graphics driver may be associated with the same virtual machine as that described above with respect to processing applications 608. As one example, the virtual graphics driver is used in the rendering of a remote desktop and other applications for one or more thin clients.

The computing environment 604 may also comprise physical graphics drivers 612 which may be associated with the virtual graphics drivers 610 and the physical graphics hardware 614. The physical graphics driver may be configured to translate and transfer data and instructions between the hardware and the virtual machines or virtual graphics drivers 610 associated with the processing of applications 608.

The physical graphics hardware 614 may be associated with the physical graphics drivers 612, the virtual graphics driver 610, the applications 608, and the capture 616 and compression 618 of frames. The graphics hardware may include GPU 112 of FIGS. 1-2(A-B), video adaptor 112 of FIG. 1 and any other components for rendering a desktop described above. The physical graphics hardware in connection with the applications 608, the virtual graphics driver 610 and physical graphics drivers 612 may comprise a rendering stage of a remote desktop.

Computing environment 604 may comprise capture 616 components. In an embodiment, when remote desktops and applications are rendered, the rendered application may be captured by capture 616 components. Capture 616 may have a rate, or frame rate associated with it. The frame rate may be the number of captures that the capture components capture over a given period of time. This may be on the order of one, ten, hundreds or thousands per second. The capture or frame rate may be associated with the rendering capabilities, or it may be associated with the capture 616 components.

Computing environment 604 may comprise compression, which may compress desktop frames captured by capture 616. The compression methods may include any method of compression of a frame known in the art, including all methods listed above. In addition, compression 618 may compare consecutive frames and send less than the entire data set based on changes in the consecutive frames and the amount of change in the consecutive frames. In general compression compresses frames such that they may be sent over network connection 606 to one or more thin clients 602 at a higher rate.

Data centers may comprise components configured to send and receive data 620. The components to send and receive data 620 may be connected to network connections 606 and may receive instructions and data from a thin client, which in turn may be transmitted to processing applications 608, and or any other components of a data center. The data may be used to instruct an application, determine configurations, configure drivers, configure capture, compression, networks and/or send and receive rates. The send and receive 620 components may also send frames of desktops, feedback, instructions, data and the like to one or more thin clients 602. The send and receive components may also send and receive feedback about the client experience that may be used in process monitoring and benchmarking.

Process monitoring and benchmarking may comprise one or more computing components such as computer 100 and 200 of FIGS. 1-2 (A-B). Process monitoring and benchmarking 622 may be configured to receive data associated with other computing elements in computing environment 604. For example, process monitoring and benchmarking 622 may receive information associated with process applications 608, virtual graphics drivers 610, physical graphics driver 612, physical graphics hardware 614, capture 616, compression 618, send and receive data 620, the thin clients 602, the network connection 606, and predetermined values 624. The data associated with each of these elements may be used by process monitoring and benchmarking 622.

Process monitoring and benchmarking 622 may compare information associated with every other component in FIG. 6 with information from predetermined values 624. For example, predetermined values 624 may comprise information indicative of the user experience at one or more thin clients 602. As a further example, the predetermined values may be associated with a frame rate for a certain standard of user experience. The predetermined value 624 may be compared against the number of frames sent over a certain period of time. Thus, the comparison may provide information indicative of jitter, user experience, quality of the desktop, benchmark, and the like of a user experience. As another embodiment, the comparison between the predetermined value and the actual value may be used to adjust one or more aspects of the cloud computing environment processes to, for example, eliminate bottlenecks, add or remove resources, increase or decrease the frame rate and the like.

In two specific embodiments, process monitoring and benchmarking may receive information indicating the time between the sending of a first frame from send and receive data 620 to a thin-client 602, and a consecutive second frame sent from send and receive data 620 to the thin client 602. This time between consecutive frames may be compared against a predetermined value 624 and may be an indicator of jitter and user experience. As another specific example, send and receive data 620 may send a frame to thin client 602 and may receive as a response to the sending, an indication that the frame was received by the thin client 602. Information indicative of the time between sending a frame and receiving a response to the sent from may be provided to the process monitoring and benchmarking 622. This value may be compared against a predetermined value 624.

In another embodiment, predetermined values 624 may comprise predetermined values for the network connection 606. As an example, process monitoring and benchmarking 622 may process information indicative of the bandwidth used by network connection 606, information about available bandwidth network connection 606, and information about changes in data transmissions on network connections 606. These values may be compared with a predetermined value from predetermined valued 624. Accordingly, the network connection can be monitored and benchmarked. This monitoring and benchmarking may be used to isolate bottlenecks in the system and to make determinations about the experience of the frame rate and data transmission at a thin client 602. Isolating bottlenecks and making determinations about the frame rate can in turn be used by the data center to adapt the allocation of resources and speeds to improve or otherwise alter the thin client 602 experience.

In another embodiment, predetermined values 624 can be related to the rendering state of a remote desktop process. The amount of time it takes to render a scene may be monitored and information indicative of the rendering process may be compared by process monitoring and benchmarking 622 to a predetermined value 624. Accordingly, it may be possible to determine if there is a bottle neck at one or more of process applications 608, virtual graphics drivers 610, physical graphics drivers 612 and physical graphics hardware 614. Each of those elements may have predetermined values compared against information indicative of their performance by process monitoring and benchmarking 622. Based on the comparisons, resources of the data center may be reallocated in order to improve or otherwise alter the rendering.

In another embodiment, there may be predetermined values associated with the capture 616 and compression 618 of frames. Information indicative of the performance of the capture 616 and compression 618 may be compared at process monitoring and benchmarking 622 with predetermined values 624. Resources may be added or subtracted to improve or otherwise alter the capture and compression of data.

Figure 7:
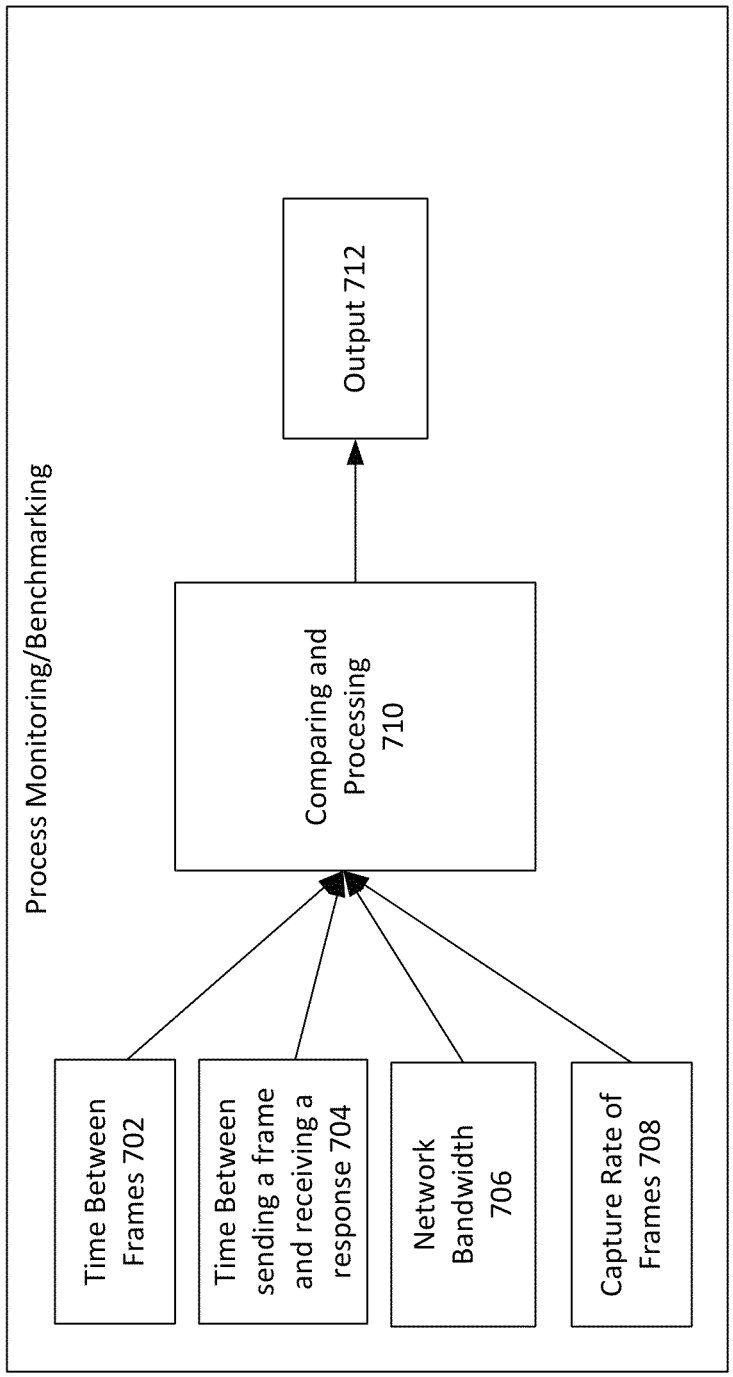
FIG. 7 depicts an example embodiment monitoring and benchmarking aspects of a server-side to client interaction.

FIG. 7 depicts an example embodiment of process monitoring and benchmarking 622 where, as a non-limiting example, information indicative of four parameters is monitored. At 702, the time between frames is monitored. Time between frames 702 can be the time between sending a first frame to a thin-client and a consecutive second frame sent to the thin client.

At 704, the time between sending a frame and receiving a response can be monitored. This is the time between sending a frame a receiving, as a response to sending the frame, a response indicating that the frame was received from the thin client.

At 706, network bandwidth can be monitored. This may be information related to the packet size sent between the data center and the thin client, and it may also include information indicative of the bandwidth available.

At 708, the capture rate of frames may be monitored. This may be information associated with the rendering and capture of frames.

At 710 the four parameters depicted are compared and processed. The comparing and processing may include incorporating information from predetermined data 624 of FIG. 6, where each of the four parameters are considered individually and in various combinations between them. Accordingly, it may be able to determine where a bottleneck is. For example, if the capture rate of frames is deemed to be low, a data center may determine that there are a lack of resources allocated to the rendering, capture and compression of the applications for the thin client 602. As such, it could be that the data center is the bottle neck and the user experience can be improved on the data center side.

As another example, if the time between sending a frame and receiving a response to the sending of the frame 704 is deemed to be substandard, however, each of the other factors is fine, it may be determined that there is a problem with the processing on the thin client. Other examples include the network bandwidth 706. If each factor is acceptable and the network bandwidth is subpar, the data center may output information indicating that a particular network connection is over extended and that resources need to be re allocated. Finally, the time between frames 702 may an indication of the user experience with respect to jitter. Accordingly, parameters used in combination may provide additional information which can be used to benchmark the quality of a user experience, isolate bottlenecks and provide information to correct bottlenecks.

Figure 8:
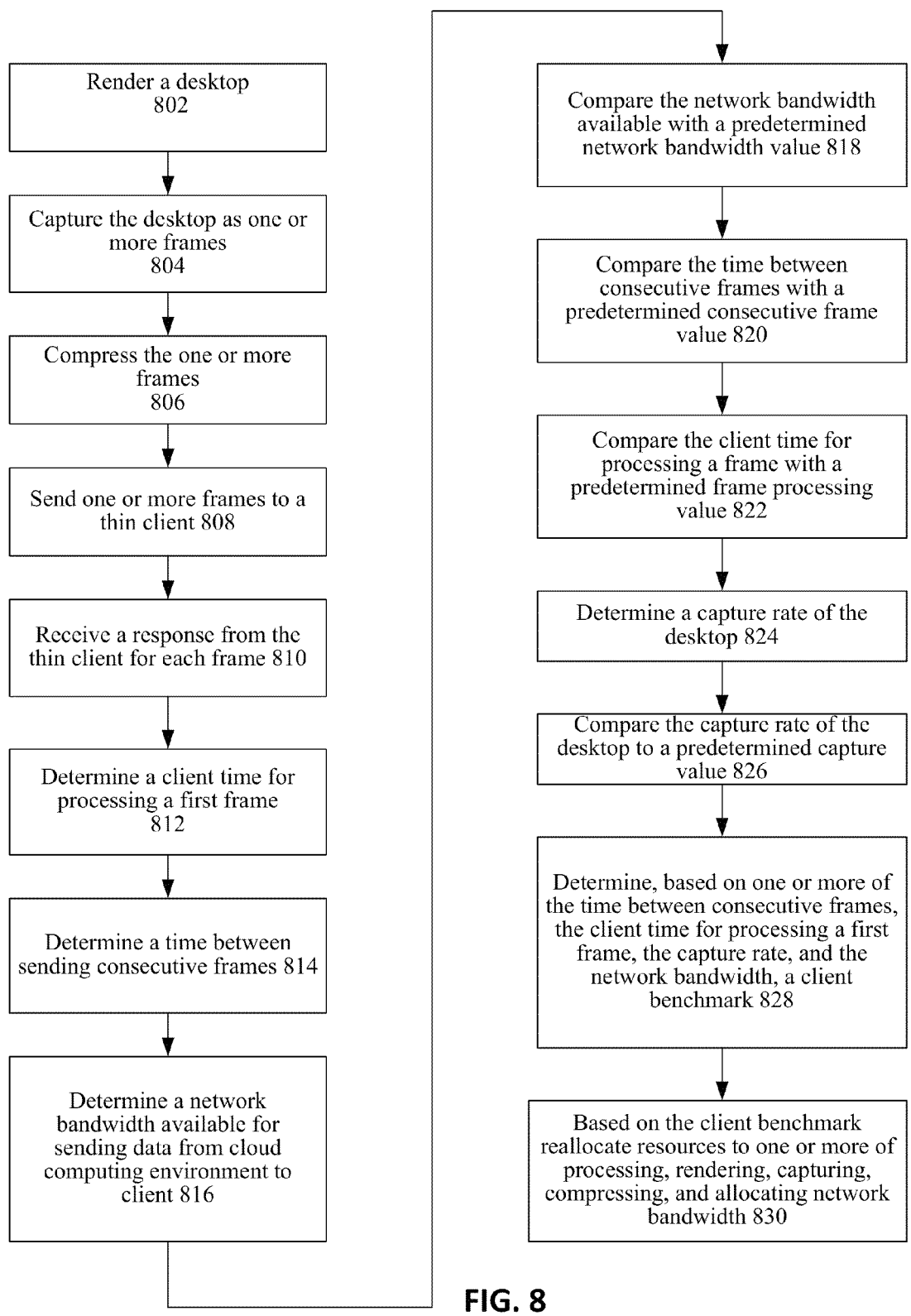
FIG. 8 depicts an example embodiment of a method of benchmarking and monitoring client performance from the server-side.

FIG. 8 depicts an example embodiment of a method for performing monitoring and benchmarking client performance from the server side. At step 802, during a remote computing session a cloud computing environment can render a desktop. As noted above, a cloud computing environment comprises one or more computing components and resources configured to render a desktop, and includes computing components such as those described above in FIGS. 1-2(A-B) as computer 100 and 200. The desktop can be rendered 802 in a virtual machine as described above with respect to FIGS. 2(A-B). Accordingly, a cloud computing environment comprises a means for rendering a desktop.

At step 804, a cloud computing environment may capture the desktop as one or more frames. As noted above, a cloud computing environment comprises one or more computing components and resources configured to capture a desktop, and includes computing components such as those described above in FIGS. 1-2(A-B) as computer 100 and 200. A virtual machine such as virtual machine as described above with respect to FIGS. 2(A-B) can capture a desktop as one or more frames 804. Accordingly, a cloud computing environment comprises means for capturing the desktop as one or more frames.

At step 806, a cloud computing environment can compress one or more frames. Compression can comprise determining what changes have been made in consecutive frames and only sending the differences, or it may comprise one of the lossy or lossless means described above. As noted above, a cloud computing environment comprises one or more computing components configured to compress one or more frames and resources and includes computing components such as those described above in FIGS. 1-2(A-B) as computer 100 and 200. A virtual machine as described above with respect to FIGS. 2(A-B) can compress the one or more frames 806. Accordingly, a cloud computing environment comprises means for compressing the one or more frames.

At step 808, a cloud computing environment can send one or more frames to a thin client. The frames may be sent over a network such as network 52 described above with respect to FIGS. 1, 3, and 5. The network can connect a thin client to a cloud computing environment. As noted above, a cloud computing environment comprises one or more computing components and resources configured to send one or more frames to a client, and includes computing components such as those described above in FIGS. 1-2(A-B) as computer 100 and 200. The cloud computing environment may have network interface servers and capabilities which may transmit and monitor data being sent and received at cloud computing environment. Accordingly, included are means for sending one or more frames to a thin client 808.

At step 810, a cloud computing environment can receive a response from the thin client for each frame sent. The frames may be received over a network such as network 52 described above with respect to FIGS. 1, 3, and 5. The network can connect a thin client to a cloud computing environment. As noted above, a cloud computing environment comprises one or more computing components and resources configured to receive a response from the thing client for each frame sent, and includes computing components such as those described above in FIGS. 1-2(A-B) as computer 100 and 200. The cloud computing environment may have network interface servers and capabilities which may receive and monitor data being sent and received at the cloud computing environment. Accordingly, included are means for receiving a response from the thin client for each frame 810.

At step 812 a cloud computing environment can determine a client time for processing a first frame 812. The client time for processing a first frame is the time between sending the first frame to a thin client and receiving, from the thin client, a response indicating that the frame was received. The frames may be sent over a network such as network 52 described above with respect to FIGS. 1, 3, and 5 and responses may be received over network 52. The cloud computing environment may have network interface servers and capabilities which are configured to receive and monitor data being sent and received at the cloud computing environment. Accordingly, included are means for determining a client time for processing a first frame 812.

At step 814 a cloud computing environment can determine a time between sending consecutive frames 814. The time for sending consecutive frames is the time between sending the first frame to a thin client and sending a second frame to a client. The frames may be sent over a network such as network 52 described above with respect to FIGS. 1, 3, and 5. The speed at which consecutive frames are sent may be representative of a user experience at a thin client and may be related to the jitter in a remote desktop session. The cloud computing environment may have network interface servers and capabilities which are configured to receive and monitor data being sent and received at the cloud computing environment. Accordingly, included are means for determining a time between sending consecutive frames.

At step 816, a cloud computing environment may determine a network bandwidth available for sending data from the cloud computing environment to a thin client 816. The network bandwidth available for sending data from the cloud computing environment to a thin client may be based on monitoring of a network such as network 52 described above with respect to FIGS. 1, 3, and 5. The cloud computing environment comprises one or more computing components configured to determine the network bandwidth available for sending data from the cloud computing environment to the thin client and includes computing components such as those described above in FIGS. 1-2(A-B) as computer 100 and 200. Accordingly, included are means for determining the network bandwidth available for sending data from the cloud computing environment to the thin client 816.

At step 818, a cloud computing environment may compare the network bandwidth available to a predetermined value. The predetermined network bandwidth value may comprise a number in a database and may be based on previous network bandwidth availabilities, or it may be an input from an administrator or a user. As one example, a predetermined network bandwidth value may be used as an indicator of a network bandwidth required for the quality of the remote desktop. In other words, if network bandwidth is insufficient, the remote desktop session may have slow interface or otherwise have a bad user experience associated with it. As one non limiting example, network bandwidth may be compared in Mb/S or B/S (Bytes per second). The network may be a network similar to network 52 described above with respect to FIGS. 1, 3, and 5. The cloud computing environment comprises one or more computing components configured to compare the network bandwidth available with a predetermined network bandwidth value and the cloud computing environment includes computing components such as those described above in FIGS. 1-2 (A-B) as computer 100 and 200. Accordingly, included are means for comparing the network bandwidth available with a predetermined network bandwidth value 818.

At step 820, a cloud computing environment may compare the time between consecutive frames with a predetermined consecutive frame value 820. The predetermined consecutive frame value may be a minimum time between sending a first frame and the time of sending of the next frame to have a certain level of quality in a remote desktop experience. As one example, a predetermined consecutive frame value may be used as an indicator of the frame rate of the desktop session and the quality of the desktop session. The predetermined consecutive frame value may be selected based on prior use, a calculation, user input. The predetermined consecutive frame value may be in a database and may be compared with a current consecutive frame value. As one non limiting example, the predetermined value may be in seconds or it may be a frame rate per second. The cloud computing environment comprises one or more computing components configured to compare the time between consecutive frames with a predetermined consecutive frame value and the cloud computing environment includes computing components such as those described above in FIGS. 1-2 (A-B) as computer 100 and 200. Accordingly, included are means for comparing the time between consecutive frames with a predetermined consecutive frame value 820.

At step 822, a cloud computing environment may compare the client time for processing a frame with a predetermined frame processing value 822. The predetermined frame processing value may be a value in a database stored by a user. It may be a value based on prior usage and experiences with a thin client, or a type of client. The predetermined frame processing value may be representative of time and it may be used to compare the actual frame processing time with the value to determine the quality of a remote desktop session. For example, if the processing time is well below a predetermined value, it may be an indication that the thin client is operating very slowly, or that the sending mechanism from the cloud computing environment is slow or that there is a problem with the bandwidth. The cloud computing environment comprises one or more computing components configured to compare the client time for processing a frame with a predetermined frame processing value and the cloud computing environment includes computing components such as those described above in FIGS. 1-2 (A-B) as computer 100 and 200. Accordingly, included are means for comparing the client time for processing a frame with a predetermined frame processing value 822.

At step 824, a cloud computing environment may determine a capture rate of a desktop 824. The capture rate of the desktop may be determined by monitoring the rate of frames exiting a capture process in the cloud computing environment. The capture rate may be related to the procession of an application by the cloud computing environment, which may take place before, during, and after the rendering, capturing and compression of data into frames for sending to a client. The cloud computing environment may have computing components, servers, and capabilities configured to determine a capture rate of a desktop. Accordingly, included are means for determining the capture rate of a desktop.

At step 826, a cloud computing environment may compare the capture rate of the desktop to a predetermined capture value. The predetermined capture value may be stored in a database or otherwise be in a memory in the cloud computing environment. The predetermined capture value may be based on prior capture rates of the particular application or thin client session, or it may be a value input by a user or administrator. The predetermined capture value is, for example, the number of captured frames per second needed for a particular quality of a remote desktop session. If, in one embodiment, the capture value is below a threshold described by the predetermined capture value, then it may be an indicator that the cloud computing environment is a bottleneck and, for example, more resources need to be allocated for one or more steps in receiving instructions, running an application, rendering, capturing and compressing. The cloud computing environment comprises one or more computing components configured to compare the capture rate of the desktop to a predetermined capture value and the cloud computing environment includes computing components such as those described above in FIGS. 1-2 (A-B) as computer 100 and 200. Accordingly, included are means for comparing the capture rate of the desktop to a predetermined capture value 826.

At step 828, a cloud computing environment may determine, based on one or more of the time between consecutive frames, the client time for processing a first frame, the capture rate, and the network bandwidth, a client benchmark. As one example, a benchmark may be related to the quality of a remote desktop session. One or more of the monitored values may be used to determine that benchmark. It is not necessary that every monitored element be included in the benchmarking, sometimes it may be sufficient that only a single monitored aspect is needed. Any algorithm, comparison or the like to determine the benchmark is included herein. The cloud computing environment comprises one or more computing components configured to determine, based on one or more of the time between consecutive frames, the client time for processing a first frame, the capture rate, and the network bandwidth, a client benchmark and the cloud computing environment includes computing components such as those described above in FIGS. 1-2 (A-B) as computer 100 and 200. Accordingly, included are means for determining, based on one or more of the time between consecutive frames, the client time for processing a first frame, the capture rate, and the network bandwidth, a client benchmark 828.

At step 830, the cloud computing environment may, based on the client benchmark, reallocate resources to one or more of processing, rendering, capturing, compressing, and allocating network bandwidth 830. As noted above, virtual machines and processes in servers, virtual machines, data centers, and cloud computing environments may migrate, and increase and decrease the number of resources based on any number of factors. Accordingly, if one or more bottleneck is found, resources may be reallocated to accommodate the bottleneck. In one embodiment, it may involve moving the network connection from a first connection that is overused to another with greater available capacity. As another embodiment, reallocation may comprise adding or subtracting hardware available for use by one or more of running an application, rendering a desktop, capturing the desktop, compressing the frames and the like. The cloud computing environment comprises one or more computing components configured to reallocate, based on the client benchmark, resources to one or more of processing, rendering, capturing, compressing, and allocating network bandwidth and the cloud computing environment includes computing components such as those described above in FIGS. 1-2 (A-B) as computer 100 and 200. Accordingly, included are means for reallocating, based on the client benchmark, resources to one or more of processing, rendering, capturing, compressing, and allocating network bandwidth 830.

It should be noted that FIG. 8 is merely representative and the steps are not intended to be presented such that they may only take place in a particular order. Further, it should be noted that monitoring and benchmarking remote desktop sessions from the server-side need not include every step. Accordingly, any number of steps in any order may be utilized in monitoring and benchmarking remote desktop session from the server side.

What is claimed:

1. A server-side benchmarking method comprising:
   rendering, on at least one computing device, a desktop;
   capturing, on the at least one computing device, the desktop as one or more frames;
   compressing, on the at least one computing device, the one or more frames; and
   determining, by the at least one computing device, a client time for processing a first frame, the client time for processing the first frame comprising a difference between a time the first frame is sent from a server computing environment to a client and the time at which an indication that the client received the first frame is received from the client at the server computing environment.

2. The server-side benchmarking method of claim 1 further comprising:
   determining, by the at least one computing device, a time between consecutive frames associated with the desktop, the time between consecutive frames comprising a difference between the time at which a first frame is sent and the time at which a second frame is sent to a client.

3. The server-side benchmarking method of claim 2 further comprising:
   comparing, by the at least one computing device, the time between consecutive frames with a predetermined value.

4. The server-side benchmarking method of claim 3 further comprising:
   determining, based on the comparison of the time between consecutive frames and a predetermined value, a client benchmark.

5. The server-side benchmarking method of claim 1 further comprising:
   comparing by the at least one computing device, the client time for processing a frame with a predetermined value.

6. The server-side benchmarking method of claim 1 further comprising:
   determining a network bandwidth available for sending data from the cloud computing environment to client.

7. The server-side benchmarking method of claim 6 further comprising:
   comparing the network bandwidth available with a predetermined value.

8. The method of claim 1, wherein the at least one computing device configured to:
   determine a capture rate of the desktop; and
   compare the capture rate to a predetermined capture value; and
   based on the comparison of the capture rate and the predetermined capture value, allocate additional resources to one or more of rendering, capturing and/or compressing the desktop.

9. A system comprising:
   a computing environment configured to at least:
   determine a capture rate of a desktop, the desktop having been rendered, captured as frames, compressed, and sent to a thin client;
   determine a time for sending consecutive frames, the time for sending consecutive frames comprising a difference between the time at which a first frame is sent to the thin client and a time at which a second frame is sent to the thin client, the second frame having been sent in order after the first frame; and
   determine, based at least in part on a response from the thin client, a thin client time for responding, the thin client time for responding comprising a difference between the time at which the first frame is sent and a time at which a response indicative of the first frame having been received at the thin client is received at a server computing environment.

10. The system of claim 9 wherein the computing environment is configured to compare the time for sending consecutive frames with a predetermined consecutive frame value; and determine, based on the time for sending consecutive frames, a thin client benchmark.

11. The system of claim 9 wherein the computing environment is configured to compare the client time for responding with a predetermined client response time value; and determine, based on the client time for responding, a thin client benchmark.

12. The system claim 9 wherein the computing environment is configured to determine a network bandwidth consumption, the network bandwidth consumption comprising an indication of an amount of bandwidth consumed by sending one or more frames to the thin client.

13. The system of claim 12 wherein the computing environment is configured to compare the network bandwidth with a predetermined network bandwidth value; and determine, based on the network bandwidth consumption, a thin client benchmark.

14. The system of claim 9 wherein the computing environment is configured to compare the capture rate of the desktop with a predetermined value, and based on the comparison, determine a thin client benchmark.

15. The system of claim 14 wherein the computing environment is configured to allocate, based on the client benchmark, additional cloud computing resources for one or more of network bandwidth, rendering, capturing, and/or compression.

16. The system of claim 9 wherein the server computing environment is a cloud computing environment.

17. A computer readable storage device having stored thereon instructions that when executed by at least one processor in a computing environment cause the computing environment to:
   compare, to a capture value, data indicative of a capture rate of a desktop, the desktop having been rendered, captured as frames, compressed, and sent the at least one processor to a thin client;
   determine, based at least in part on a response from a thin client, a time for sending consecutive frames, the time for sending consecutive frames comprising a difference between the time at which a first frame is sent to the thin client and a time at which a second frame is sent to the thin client, the second frame having been sent in order after the first frame; and
   determine, based on the time for sending consecutive frames, a thin client benchmark.

18. The computer readable storage device of claim 17 wherein the instructions cause the at least one processor to determine a thin client time for responding, the thin client time for responding comprising a difference between the time at which the first frame is sent and a time at which a response indicative of the first frame having been received at the thin client is received at the computing environment.

19. The computer readable storage device of claim 17 wherein the instructions cause the at least one processor to compare the client time for responding with a predetermined client response time value.

20. The computer readable storage device of claim 17 wherein the instructions cause the at least one processor to determine a network bandwidth consumption, the network bandwidth consumption comprising an indication of an amount of bandwidth consumed by sending one or more frames to the thin client.

* * * * *